US011027847B2

(12) United States Patent
Itzinger

(10) Patent No.: US 11,027,847 B2
(45) Date of Patent: Jun. 8, 2021

(54) TRANSPORT SEAT SYSTEM

(71) Applicant: RECARO Aircraft Seating GmbH & Co. KG, Schwaebisch Hall (DE)

(72) Inventor: Andreas Itzinger, Michelfeld (DE)

(73) Assignee: RECARO Aircraft Seating GmbH & Co. KG, Schwäbisch Hall (DE)

( * ) Notice: Subject to any disclaimer, the term of this patent is extended or adjusted under 35 U.S.C. 154(b) by 358 days.

(21) Appl. No.: 16/064,567

(22) PCT Filed: Dec. 23, 2016

(86) PCT No.: PCT/EP2016/082584
§ 371 (c)(1),
(2) Date: Jun. 21, 2018

(87) PCT Pub. No.: WO2017/109188
PCT Pub. Date: Jun. 29, 2017

(65) Prior Publication Data
US 2018/0370635 A1 Dec. 27, 2018

(30) Foreign Application Priority Data

Dec. 23, 2015 (DE) .................. 10 2015 122 816.5

(51) Int. Cl.
*B64D 11/06* (2006.01)
*B60N 2/30* (2006.01)
*B60N 2/12* (2006.01)

(52) U.S. Cl.
CPC .......... *B64D 11/0601* (2014.12); *B60N 2/12* (2013.01); *B60N 2/309* (2013.01); *B60N 2/3065* (2013.01);
(Continued)

(58) Field of Classification Search
CPC ............ B64D 11/0601; B64D 11/0639; B64D 11/0648; B64D 11/0696; B60N 2/12; B60N 2/3065; B60N 2/309; B60N 2/3093
See application file for complete search history.

(56) References Cited

U.S. PATENT DOCUMENTS 4,936,527 A * 6/1990 Gorges ...................... B64C 1/20
104/165
5,364,152 A * 11/1994 Mastrangelo ........ B60N 2/3011
296/65.03
(Continued)

FOREIGN PATENT DOCUMENTS

DE 10 2005 009 040 A1 8/2006
DE 10 2009 020 199 A1 11/2009
(Continued)

OTHER PUBLICATIONS

Search Report dated Jul. 28, 2017 issued in corresponding DE patent application No. 10 2015 122 816.5 (and partial English translation).
(Continued)

*Primary Examiner* — Philip F Gabler
(74) *Attorney, Agent, or Firm* — Posz Law Group, PLC

(57) ABSTRACT

A transport seat system, in particular aircraft seat system, includes at least one first seat, with at least one mounting module that is configured, for the purpose of mounting the seat, to be connected on a guide rail, and with at least one second seat, which is arranged behind the first seat with at least one mounting module that is configured, for the purpose of mounting the seat, to be connected on the same guide rail, the two seats being configured, for the purpose of implementing a usage position and a stowage position of at least one of the seats, to be displaced on the guide rail relative to one another, wherein
(Continued)

Figure 3:
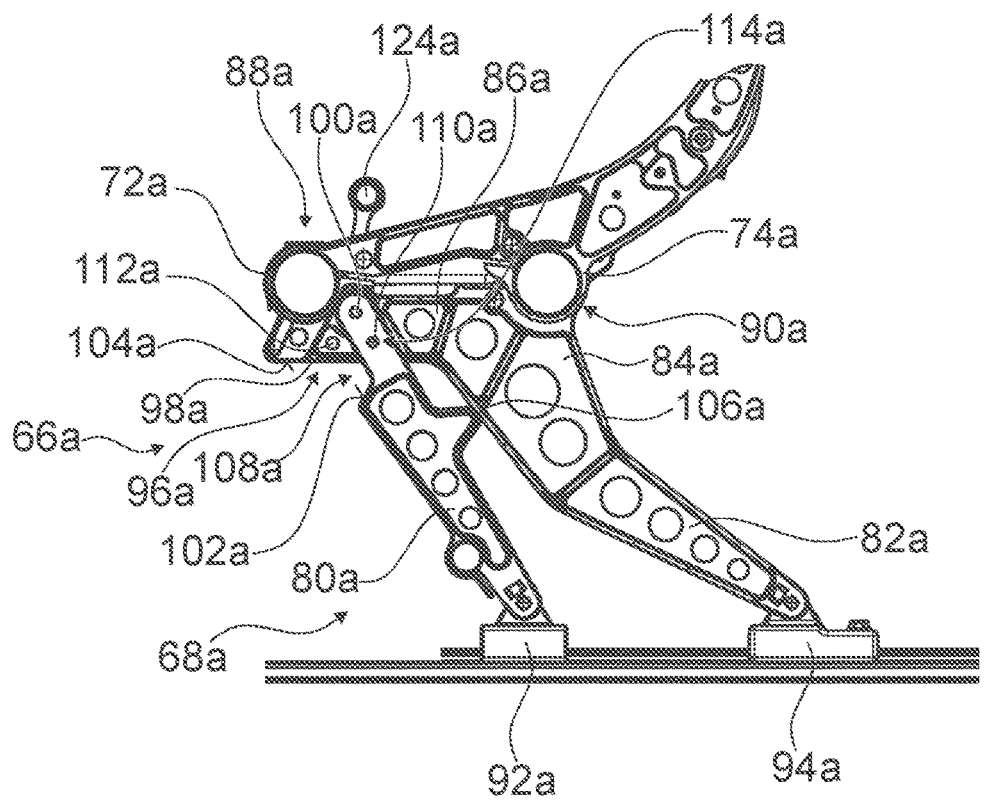

at least one mounting module of at least one of the seats includes a seat foot unit, which is movably supported relative at least to a portion of the mounting module.

18 Claims, 7 Drawing Sheets

(52) U.S. Cl.
CPC ........ *B60N 2/3093* (2013.01); *B64D 11/0639* (2014.12); *B64D 11/0648* (2014.12); *B64D 11/0696* (2013.01)

(56) References Cited

U.S. PATENT DOCUMENTS

| | | | | |
|---|---|---|---|---|
| 6,561,458 | B1 * | 5/2003 | Lowery | B64D 11/0696 |
| | | | | 244/118.6 |
| 7,083,146 | B2 * | 8/2006 | Hiesener | B64D 11/064 |
| | | | | 244/118.6 |
| 7,712,829 | B2 * | 5/2010 | Park | B60N 2/0881 |
| | | | | 297/234 |
| 9,656,753 | B2 * | 5/2017 | Schomacker | B64D 11/0696 |
| 10,647,432 | B2 * | 5/2020 | Itzinger | B60N 2/3031 |
| 10,710,727 | B2 * | 7/2020 | Gross | B64D 11/0648 |
| 2010/0308619 | A1 * | 12/2010 | Hoge | B60N 2/12 |
| | | | | 296/65.08 |
| 2011/0101162 | A1 | 5/2011 | Zimmermann et al. | |
| 2011/0260489 | A1 * | 10/2011 | Gerhardt | B60N 2/3065 |
| | | | | 296/65.01 |
| 2012/0175930 | A1 * | 7/2012 | Jovicevic | B60R 22/26 |
| | | | | 297/331 |
| 2014/0306061 | A1 | 10/2014 | Schomacker et al. | |
| 2014/0375090 | A1 | 12/2014 | Wegenka et al. | |
| 2018/0194476 | A1 * | 7/2018 | Gross | B64D 11/0696 |

FOREIGN PATENT DOCUMENTS

| | | |
|---|---|---|
| DE | 10 2009 004 987 A1 | 7/2010 |
| DE | 10 2010 004 798 A1 | 7/2011 |
| DE | 10 2013 103 667 A1 | 10/2014 |
| EP | 2 727 791 A1 | 5/2014 |
| EP | 2 803 580 A2 | 11/2014 |
| EP | 2 803 581 A2 | 11/2014 |

OTHER PUBLICATIONS

International Search Report of the International Searching Authority dated Mar. 20, 2017 issued in corresponding International patent application No. PCT/EP2016/082584.

International Preliminary Report on Patentability dated Jun. 26, 2018 issued in corresponding International patent application No. PCT/EP2016/082584.

* cited by examiner

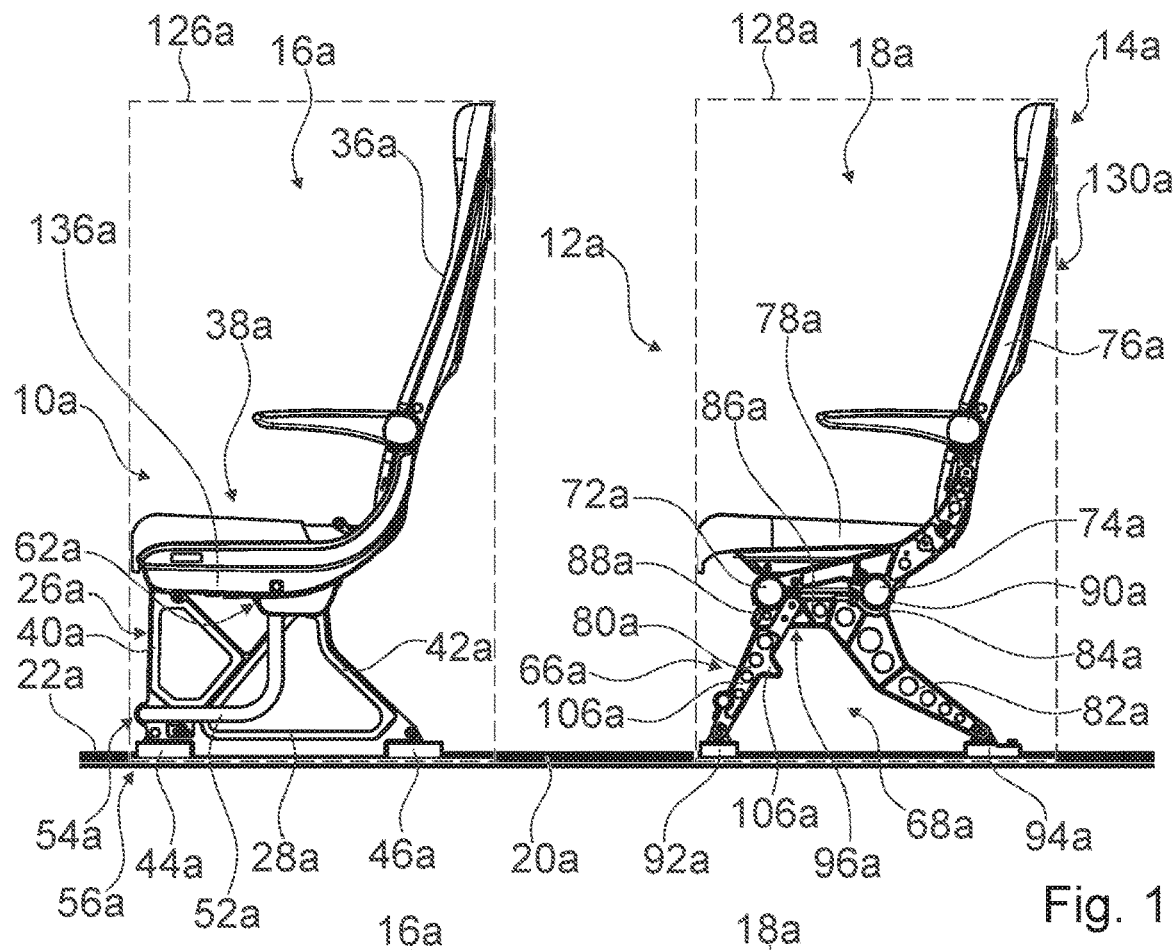
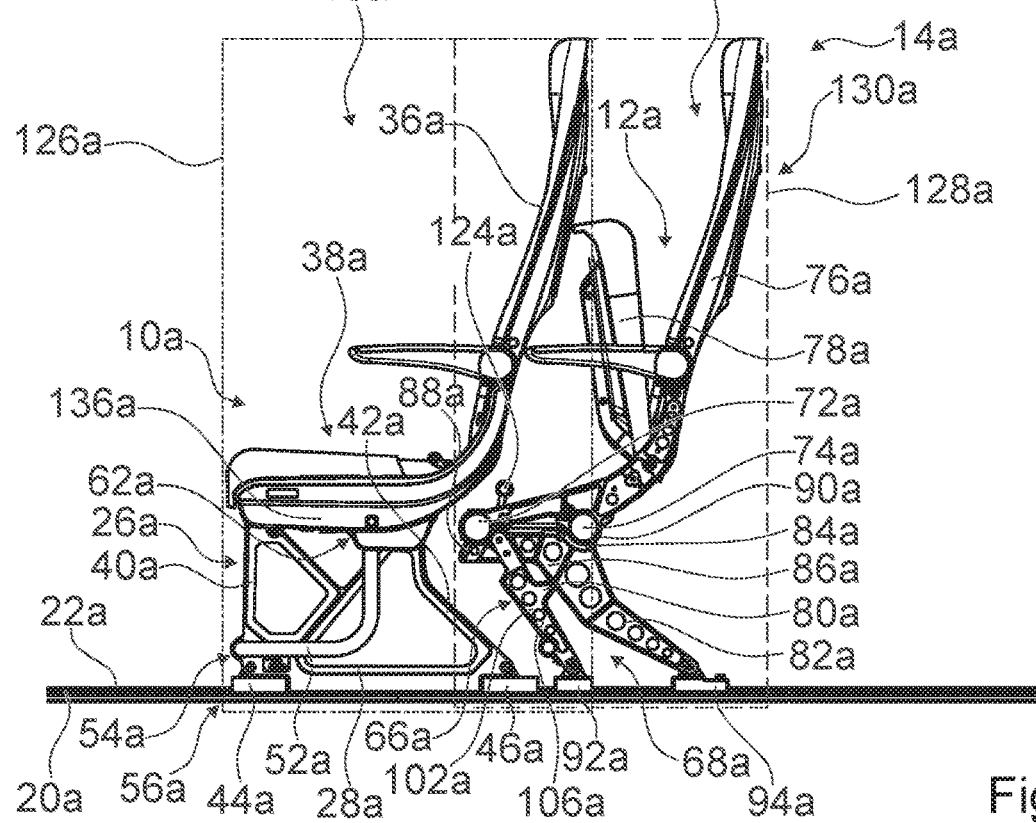

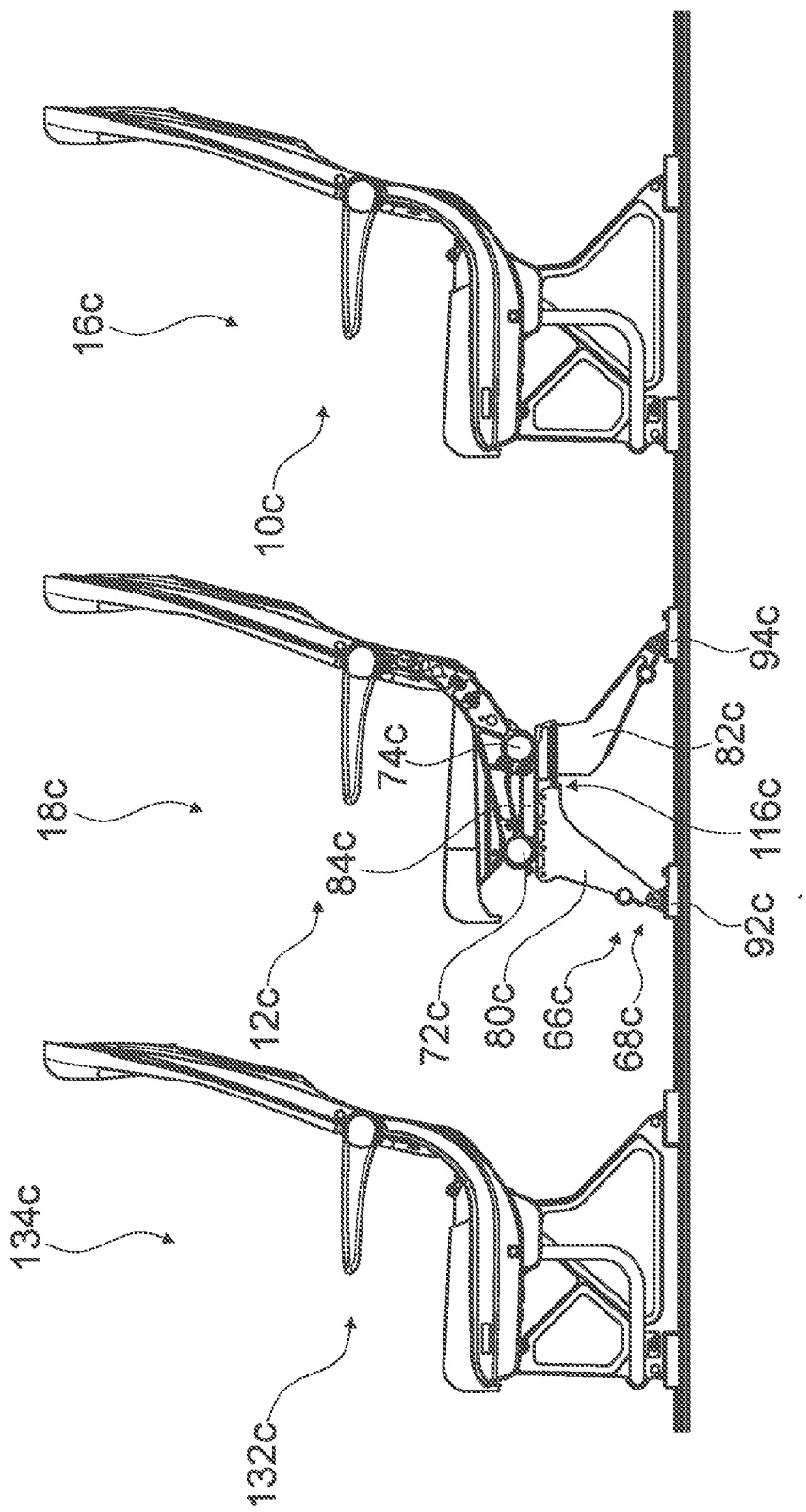

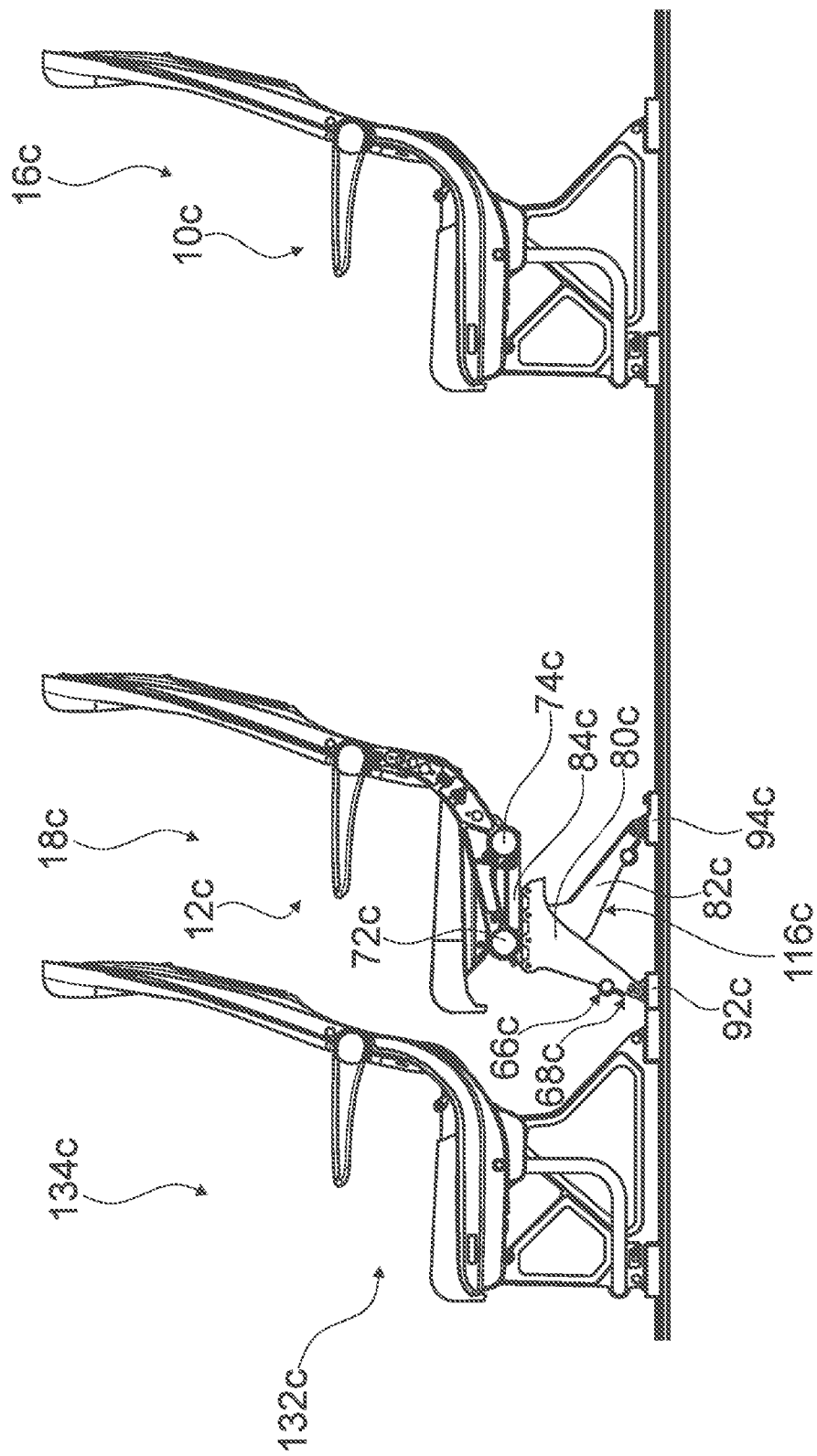

TRANSPORT SEAT SYSTEM

CROSS REFERENCE TO RELATED APPLICATIONS

This application is a U.S. national stage application of PCT/EP2016/082584 filed on Dec. 23, 2016, which is based on German Patent Application No. 10 2015 122 816.5 filed on Dec. 23, 2015, the contents of which are incorporated herein by reference.

STATE OF THE ART

The invention concerns a transport seat system according to the preamble of patent claim 1.

A transport seat system, in particular an aircraft seat system, has already been proposed, with at least one first seat, which comprises at least one mounting module that is configured, for the purpose of mounting the seat in a transport means, to be connected on a guide rail, and with at least one second seat, which is arranged behind the first seat and comprises at least one mounting module that is configured, for the purpose of mounting the seat in the transport means, to be connected on the same guide rail, the two seats being configured, for the purpose of implementing a usage position and a stowage position of at least one of the seats, to be displaced on the guide rail relative to one another.

In particular, in EP 2 803 581 A2 an aircraft seat system with at least two seats has already been proposed, said seats being connected on the same guide rail and being configured, for the purpose of implementing a usage position and a stowage position of the seats, to be displaced on the guide rail relative to one another. In particular, the aircraft seat system known from the document mentioned above has the disadvantage that, in a stowage position, the backrests of the seats have a height that is contrary to be permissible in aircraft due to safety reasons.

In EP 2 803 580 A2 an aircraft seat system has already been proposed which comprises a plurality of seats which are displaceable on guide rails relative to one another.

The features disclosed in the documents mentioned above should herein be considered to be included in the disclosure of the present application.

The objective of the invention is in particular to provide a generic device with improved characteristics regarding a variability and a permissibility. The objective is achieved, according to the invention, by the features of patent claim 1 while advantageous implementations and further developments of the invention may be gathered from the subclaims.

Advantages of the Invention

The invention is based on a transport seat system, in particular an aircraft seat system, with at least one first seat, which comprises at least one mounting module that is configured, for the purpose of mounting the seat in a transport means, to be connected on a guide rail, and with at least one second seat, which is arranged behind the first seat and comprises at least one mounting module that is configured, for the purpose of mounting the seat in the transport means, to be connected on the same guide rail, the two seats being configured, for the purpose of implementing a usage position and a stowage position of at least one of the seats, to be displaced on the guide rail relative to one another.

It is proposed that at least one mounting module of at least one of the seats comprises a seat foot unit, which is movably supported relative at least to a portion of the mounting module. A "transport seat system" is herein in particular to mean a system of at least two seats which, viewed in a seat direction of the seats, are arranged one behind the other one and are configured to be arranged in a transport means like, for example, a train, a bus or another transport means that is deemed expedient by someone skilled in the art. Particularly preferably the transport seat system is implemented as an aircraft seat system. The transport seat system herein preferentially comprises more than two seats. By a "seat" is herein in particular a passenger seat to be understood which is configured to provide a seating for a passenger within a transport means. The seat herein preferably comprises a mounting unit by means of which the seat is fixedly mountable on a cabin floor. Herein the seat is preferentially implemented as part of a seat row comprising a plurality of substantially identically embodied seats, which are mounted on the cabin floor by means of a shared mounting unit. A seat herein preferably further comprises a seat bottom and at least one backrest. By a "seat bottom" is herein in particular a unit to be understood which implements the sitting region for a passenger, wherein the seat bottom is preferably implemented by a base body and a cushion that is attached on the base body. By a "sitting region" is herein in particular a region of the seat to be understood which is configured for a passenger to sit on it, in particular during a transport, for example during a flight. A "backrest" is herein in particular to mean a unit of the seat implementing a backrest support surface allowing a passenger sitting on the seat to rest his back against. Herein the backrest preferably comprises at least one base body and a cushion that implements the backrest support surface. The backrest is herein arranged on a rear end of the seat bottom and extends from the seat bottom upwards, away from the mounting unit. Herein it is conceivable that the seat bottom and the backrest are connected to one another rigidly or that, to implement different seat positions, the seat bottom and the backrest are embodied to be movable with respect to each other. An "aircraft seat system" is herein in particular to mean a system of at least two aircraft seats which are, as regards their seat direction, arranged one behind the other one, the system being arranged in an aircraft cabin. Herein a seat embodied as an aircraft seat is mounted in an aircraft cabin to implement a seating for a passenger. By a "mounting module" is herein in particular a part of a mounting unit to be understood via which at least portions of a force acting onto the seat are discharged into a mounting plane. A mounting module is herein connected to a guide rail and preferably comprises at least one seat foot unit. By a "seat foot unit" is herein in particular a unit to be understood which connects the seat to a cabin floor of the transport means, on which the seat that the mounting module constitutes a part of is mounted. The seat foot unit is herein, on a lower end, preferentially coupled with the cabin floor by a fixation element. Herein the seat foot unit is, on said lower end, in particular coupled with a guide rail. On an upper end the seat foot unit is connected with a remaining portion of the mounting module and/or is coupled with a carrier profile. By a "mounting unit" is herein in particular a unit to be understood by means of which the seat is mounted on the mounting plane. The mounting unit herein preferably comprises a first mounting module, which is coupled with a first guide rail, and a second mounting module, which is coupled with a second guide rail. Principally it is also conceivable that the mounting unit comprises further mounting modules. Herein the mounting unit is configured for mounting all the seats which are comprised to implement a contiguous seat row on the mounting plane. By a "guide rail" is herein in particular a rail to be understood which is configured for a connection of an element or a module, like in particular a part of a mounting module, in a form-fit and/or force-fit manner. Herein a guide rail is preferentially embodied as a separate rail, which is connected to a fixation rail that is fixedly arranged in the mounting plane. Principally it is also conceivable that the guide rail is embodied by a fixation rail that is fixedly arranged in the mounting plane of the transport means. "Connected" is herein in particular to mean connected to a further element, like for example the guide rail, in a form-fit and/or force-fit manner. Herein the element that is connected to the guide rail has, in terms of movement, at least one degree of freedom at least in one operating state and is therefore displaceable, for example, in parallel to the guide rail. By a "usage position" is herein in particular a position of the seat to be understood in which it is mounted in the transport means in such a way that it is appropriately usable by a person, wherein the seat is in particular built in a way allowing a passenger sitting on the seat in an appropriate fashion, in particular during transport. By a "stowage position" is herein in particular a position of the seat to be understood in which, in particular, a person cannot sit on the seat in an appropriate manner, wherein the seat preferably has smallest possible dimensions or is arranged interlaced with other seats or spatial features, as a result of which it is possible to arrange the seat in the stowage position in a particularly space-saving fashion. Herein, in the stowage position and in the usage position, a supporting seat structure of the mounting unit, like in particular transverse supports and seat dividers of the seats, continue to be oriented with respect to each other in an at least substantially identical fashion. By a "portion of the mounting module" is herein in particular a rigid portion of the mounting module to be understood, e.g. an element that is connected to a transverse support of the mounting unit. "Movably supported" is herein in particular to mean fixated movably relative to an element via a support unit. A movement allowed by the support unit in at least one operating state may herein be a linear displacement and/or a rotation around at least one rotary axis. By an implementation according to the invention a seat is arrangeable in its stowage position in an especially space-saving fashion. "Configured" is in particular to means specifically designed and/or equipped. By an object being configured for a certain function is in particular to be understood that the object fulfills and/or implements said certain function in at least one application state and/or operating state. This in particular allows providing a transport means system which is advantageously flexible and in which non-required seats are easily stowable, as a result of which it is possible to provide seats with increased legroom.

It is also proposed that the seats each comprise a backrest, which has an upright position in the usage position as well as in the stowage position. By an "upright position of the backrest" is herein in particular a position of the backrest to be understood in which the backrest is oriented substantially perpendicularly to the mounting plane and in which in particular utility elements fixated to the backrest, like in particular a table or a holder element, which is in particular arranged on a rear side of the backrest, are usable by a passenger sitting behind the seat. Herein the backrests of the seats have a same height in the usage position and in the stowage position. By "the backrest having a same height in the usage position and in the stowage position" is herein in particular to be understood that respective distances between an uppermost edge of the backrest and the mounting plane are equal in the stowage position and in the usage position. In this way it is in particular advantageously achievable that the seat that is in the stowage position has utility elements which are usable by a passenger sitting behind the seat.

Furthermore it is proposed that the backrests of the seats have a same position in the usage position and in the stowage position. By a "same position" is herein in particular a substantially identical position to be understood, i.e. in particular an identical height, an identical inclination and/or an identical orientation to a defined reference plane and/or reference point. Herein a backrest has in the stowage position and in the usage position a substantially identical height and identical inclination, preferentially precisely identical height and inclination with respect to a cabin floor which the seat is mounted on. In particular, the backrest is in the stowage position and in the usage position arranged in a TTL position. By a "TTL position" is herein in particular an upright position of the aircraft seat to be understood which has to be taken for safety reasons, in particular in a takeoff phase, in a landing phase and during turbulences. Herein, in the TTL position a backrest of the aircraft seat and the seat bottom are oriented perpendicularly to one another, preferably at an angle between 90 degrees and 110 degrees. The TTL position herein implements a first end position, into which the backrest of the aircraft seat is maximally adjustable. Preferentially the backrest of a seat is in the stowage position and in the usage position oriented identically. In particular, the backrest is in the stowage position arranged in a position that corresponds to a permitted seat position of the seat. Herein the backrest is, in the stowage position, in particular arranged not higher than in a usage position. Components arranged at the backrest like, for example, a table, a cup holder, a tablet holder and/or a literature pocket, are usable in a same range and in a same way in the stowage position as in a usage position of the seat. In an adjustment from the usage position into the stowage position, the backrest is in particular not pivoted with respect to the cabin floor nor is it lifted with respect to said cabin floor. As a result of this, in the stowage position of the seat the backrest may be arranged in a particularly advantageous manner.

It is moreover proposed that in the stowage position at least one of the seats is arranged with its mounting module at least partially overlapping with the mounting module of the other seat. By "at least partially overlapping" is herein in particular to be understood that elements, like in particular the mounting modules of the seats, coincide along a displacement direction of a guide rail via which the seat is mounted. Herein in particular enveloping curves of the two seats coincide in the stowage position. Herein the enveloping curves of the two seats coincide in the stowage position by at least 20%, preferably by at least 25% and particularly advantageously by at least 33%. By an "enveloping curve" is herein in particular an imaginary curve to be understood which is drawn around the largest dimensions of a seat wherein, in a rearmost point of the seat, the rear side of the enveloping curve is drawn, perpendicularly to the mounting plane, from the mounting plane upwards, extending up to the uppermost end of the backrest, and wherein, in a foremost end, the frontal side of the enveloping curve is drawn, perpendicularly to the mounting plane, from the mounting plane upwards and extends up to the uppermost end of the backrest. This allows two seat rows, which are arranged one behind the other one, to be arranged with respect to one another in an especially advantageous space-saving manner in at least one stowage position.

Beyond this it is proposed that the movable seat foot unit is embodied as a front seat foot unit of the second seat. By a "front seat foot unit" is herein in particular a seat foot unit of a mounting module to be understood which is, viewed in a seat direction of the seat, arranged on a front end of the seat. This allows implementing the mounting module of the second seat in a particularly advantageous fashion.

It is further proposed that the one seat foot unit of the mounting module of the one seat is movable relative to a second seat foot unit for the purpose of an adjustment between the usage position and the stowage position. It is herein conceivable that the movably supported seat foot unit is embodied as a front seat foot unit or as a rear seat foot unit. By a "rear seat foot unit" is herein in particular a seat foot unit of a mounting module to be understood which is, viewed in a seat direction of the seat, arranged on a rear end of the seat. This allows implementing the mounting module of the second seat in a particularly advantageous fashion.

It is also proposed that the mounting module comprises a linear bearing, via which the movable seat foot unit is displaceable with respect to the other seat foot unit. By a "linear bearing" is herein in particular a bearing device to be understood via which the two elements coupled by the bearing device are movable with respect to one another along a displacement path. The displacement path of the linear bearing is herein preferentially implemented by a straight line. Principally it is however also conceivable that a displacement path of the linear bearing features a curved course. This allows displacing a front seat foot unit especially advantageously and far with respect to the rear seat foot unit, as a result of which an especially advantageous overlap of two seats is achievable.

It is moreover proposed that the mounting module comprises a pivot bearing, via which the front seat foot unit is pivotable. By a "pivot bearing" is herein in particular a bearing device to be understood via which two elements, which are coupled via the bearing device, are rotatable relative to one another around a rotary axis. Principally it would also be conceivable that the mounting module comprises a plurality of bearings. Principally it would also be conceivable that the mounting module herein comprises a combination of one or a plurality of pivot bearings and/or one or a plurality of linear bearings. Herein a pivot bearing is preferably restricted to a defined pivot angle, by which the two elements are rotatable relative to one another. This allows advantageously supporting the seat foot unit in such a way that it is particularly easily movable relative to the remaining portion of the mounting module.

Furthermore it is proposed that the mounting module of the second seat implements a base body, which implements the rear seat foot unit as well as a support region between two transverse supports of the seat. By a "base body" is herein in particular an integrally implemented body to be understood, which implements a portion, preferably a large portion, of a module, like in particular the mounting module. By a "support region" is herein in particular a region of the base body to be understood that features a connection to transverse supports of the mounting unit and/or a connection to a seat bottom of the seat. By a "transverse support" is herein in particular a part of the mounting unit to be understood, extending transversely to the seat direction of the seats which are mounted via the mounting unit. A seat herein preferably comprises a front transverse support and a rear transverse support. This allows implementing the mounting module in a particularly advantageous fashion.

It is also proposed that the first seat comprises at least one trigger element, which is configured to be actuated for adjusting the first seat between a lock position and a displacement position. By a "trigger element" is herein in particular an element to be understood by which a user may trigger an action like, for example, an unlocking or locking of a locking element. It is herein conceivable that the trigger element is embodied as a rigid actuation element, for example a lever element, or as a pull element, for example a Bowden cable. It is herein principally also conceivable that the trigger element is embodied as a portion of the aircraft seat like, for example, an armrest or a backrest. Herein a lever effect is triggerable for an adjustment of an actuation via the armrest or via the backrest. Principally it is also conceivable that the trigger element is actuatable via an electronic or electro-magnetical triggering. By a "lock position" is herein in particular a position to be understood in which a seat or at least a seat foot unit of a seat is rigidly coupled with the guide rail and is not displaceable on the guide rail. In the lock position the seat or at least a seat foot unit of the seat has no degree of freedom allowing a movement relative to the guide rail. By a "displacement position" is herein in particular a position of the seat to be understood in which a seat or at least a seat foot unit of the seat is supported on the guide rail in such a way that it is displaceable along a displacement path of the guide rail, and is displaceable on the guide rail between different positions, like in particular a usage position and a stowage position, or between different locations. In this way the at least one seat is advantageously lockable or releasable, for an adjustment, in a particularly simple fashion.

Moreover it is proposed that the first seat comprises at least two mounting modules, which are together triggered by the trigger element. The term that the "trigger element together triggers the mounting modules" is herein in particular to mean that the trigger element extends at least over a distance between the two mounting modules and is coupled at least with the two mounting modules for the purpose of adjusting them, via an actuation by a person, between a lock position and a displacement position. Herein the two mounting modules, in particular fixation elements of both mounting modules, are actuatable by the one trigger element. In this way an adjustment of the seat between its lock position and its displacement position may be effected in a particularly simple manner.

It is further proposed that the trigger element is embodied as a luggage bar. By a "luggage bar" is herein in particular a bar to be understood which extends between the mounting plane and the seat bottom of a seat and is configured to prevent objects, like in particular luggage parts, from slipping through below the seat bottom. Herein the luggage bar preferentially extends transversely to a seat direction of the seat over an entire width of a seat or of a seat row as well as in a lateral end region of the seat in the seat direction. As a result of this, the trigger element may be implemented in an especially advantageous fashion.

It is furthermore proposed that the first seat comprises at least one fixation element, which couples the at least one mounting module with the guide rail, wherein the fixation element comprises at least one locking element that is adjustable between a locked position and an unlocked position by the trigger element. By a "fixation element" is herein in particular an element to be understood that is configured to connect two further elements, like in particular a guide rail and a mounting module, to one another in a form-fit and/or force-fit manner. The fixation element herein preferably comprises two operating states, namely a locked position and an unlocked position. By a "locked position" is herein in particular an operating state of the fixation element to be understood in which the fixation element is rigidly arranged on the guide rail and in particular no movement is possible along a displacement direction of the guide rail. In the locked position forces are also introducible, in the displacement direction, into the guide rail by the fixation element. By an "unlocked position" is herein in particular an operating state of the fixation element to be understood in which the fixation element is connected to the guide rail in such a way that the fixation element is displaceable on the guide rail in the displacement direction of the guide rail. In the unlocked position no forces are introducible, along the displacement direction of the guide rail, into the guide rail by the fixation element. This allows mounting the seat in the transport means in a particularly simple manner.

Beyond this it is proposed that the first seat comprises at least one second fixation element for a connection to a second guide rail, wherein the second fixation element is actuatable together with the first fixation element by the trigger element. "Actuable together" is herein in particular to mean that both fixation elements are switchable between the locked position and the unlocked position by a shared unlocking or locking movement of the trigger element. This allows a particularly simple displacement of the seat between its lock position and its displacement position.

It is also proposed that the entire trigger element is movably supported in the at least one mounting module. "Movably supported" is in particular to mean, in this context, that the trigger element is movable relative to a mounting module in at least one operating state, wherein it is conceivable that the trigger element is herein rotated or is displaced in a displacement direction relative to the mounting module. In this way the trigger element is mountable at the seat in a particularly advantageous fashion.

Furthermore it is proposed that the transport seat system comprises at least one locking mechanism, which locks the movable seat foot unit in at least one position. This advantageously allows a locking of the movable seat foot unit in different positions.

The transport seat system according to the invention is herein not to be limited to the application and implementation described above. In particular, for the purpose of fulfilling a functionality herein described, the transport seat system according to the invention may comprise a number of individual elements, structural components and units that differs from a number that is mentioned here.

DRAWINGS

Further advantages will become apparent from the following description of the drawings. The drawings show three exemplary embodiments of the invention. The drawings, the description and the claims contain a plurality of features in combination. Someone skilled in the art will purposefully also consider the features separately and will find further expedient combinations.

Figure 4:
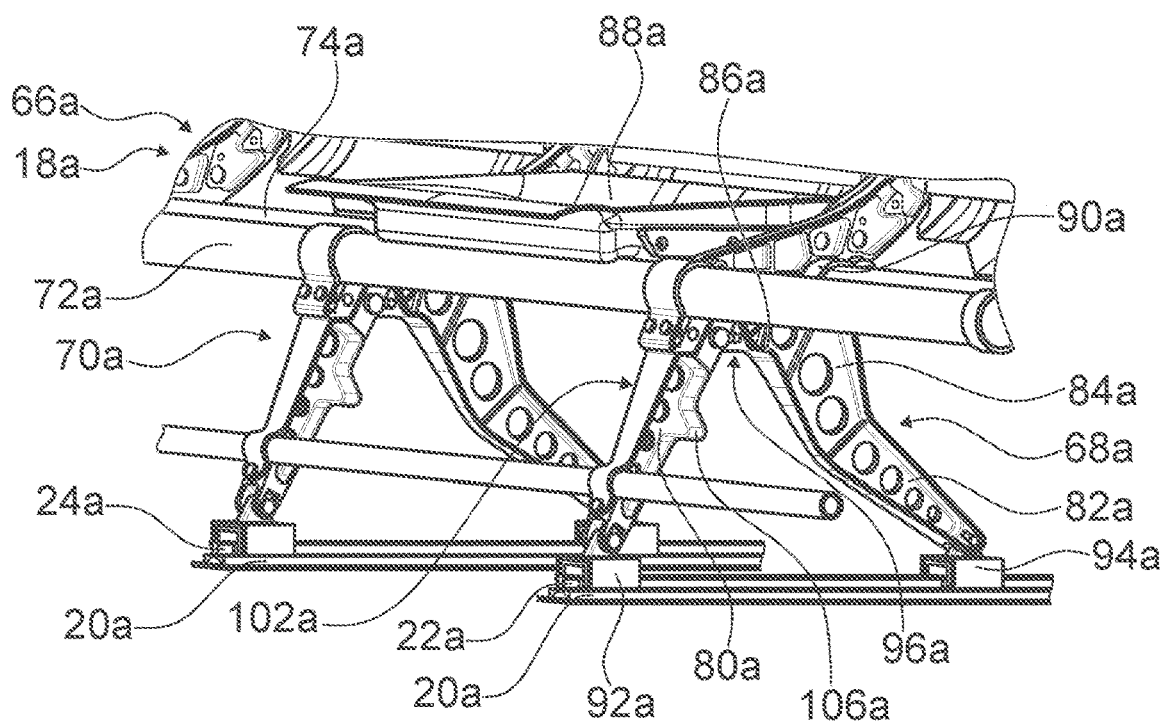
Figure 5:
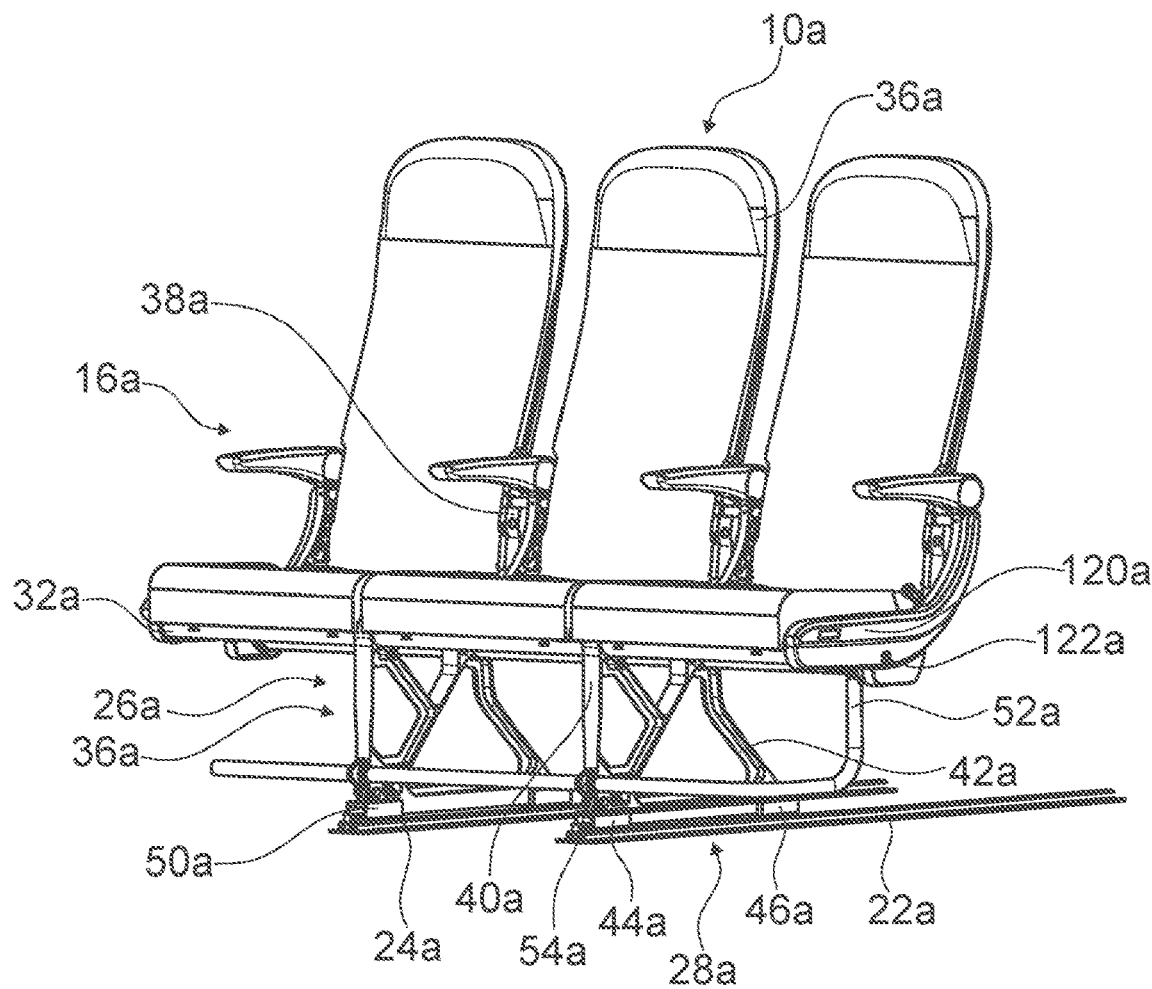
Figure 6:
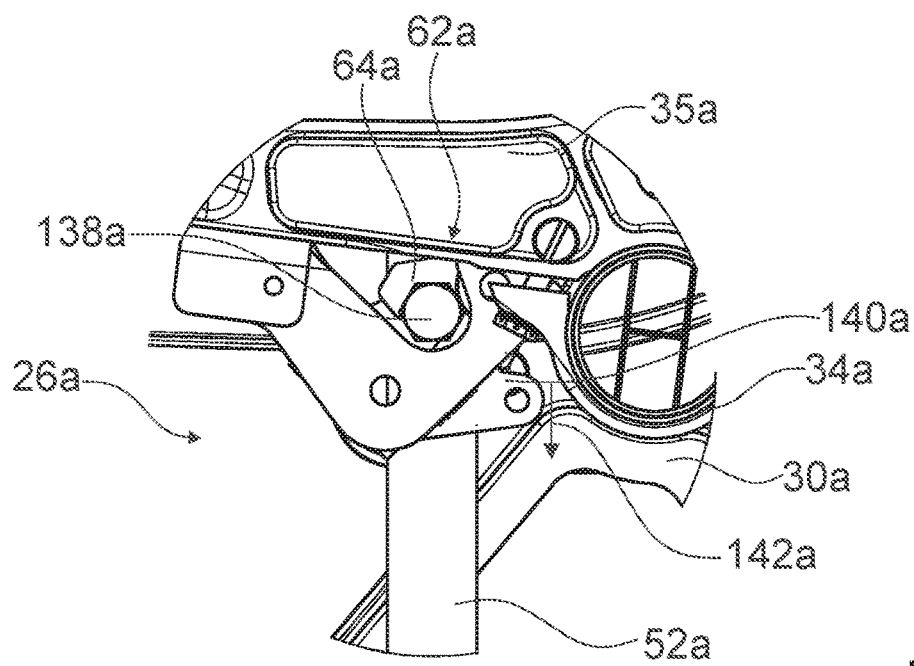
Figure 7:
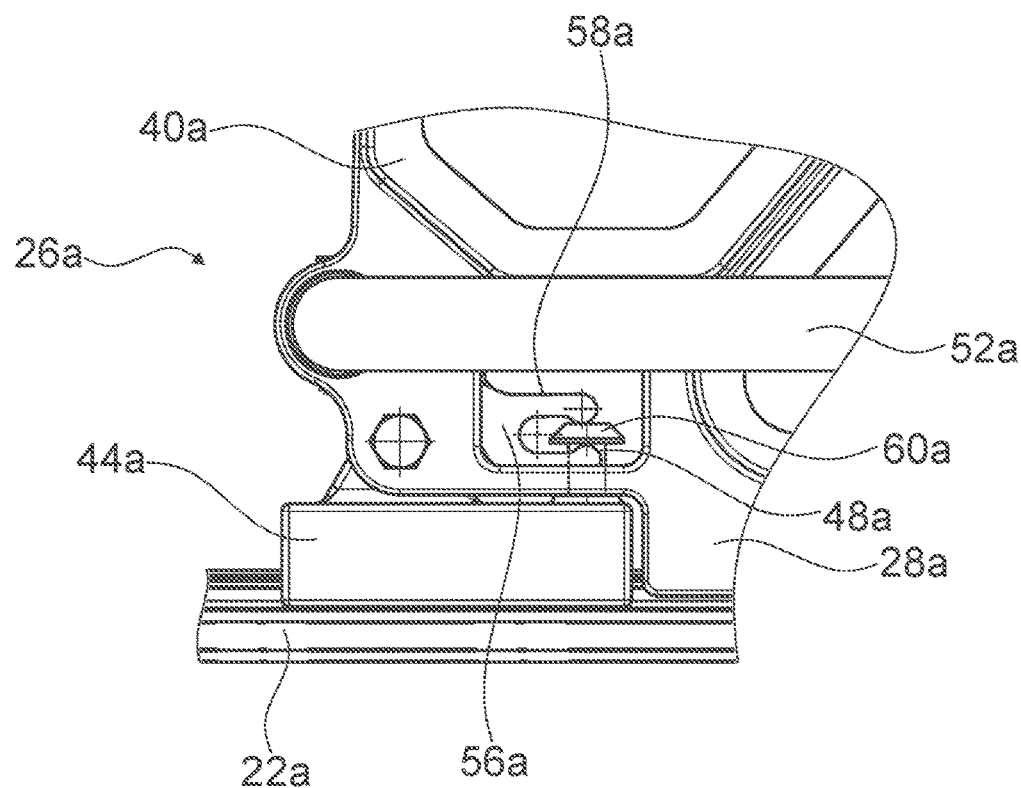
Figure 8:
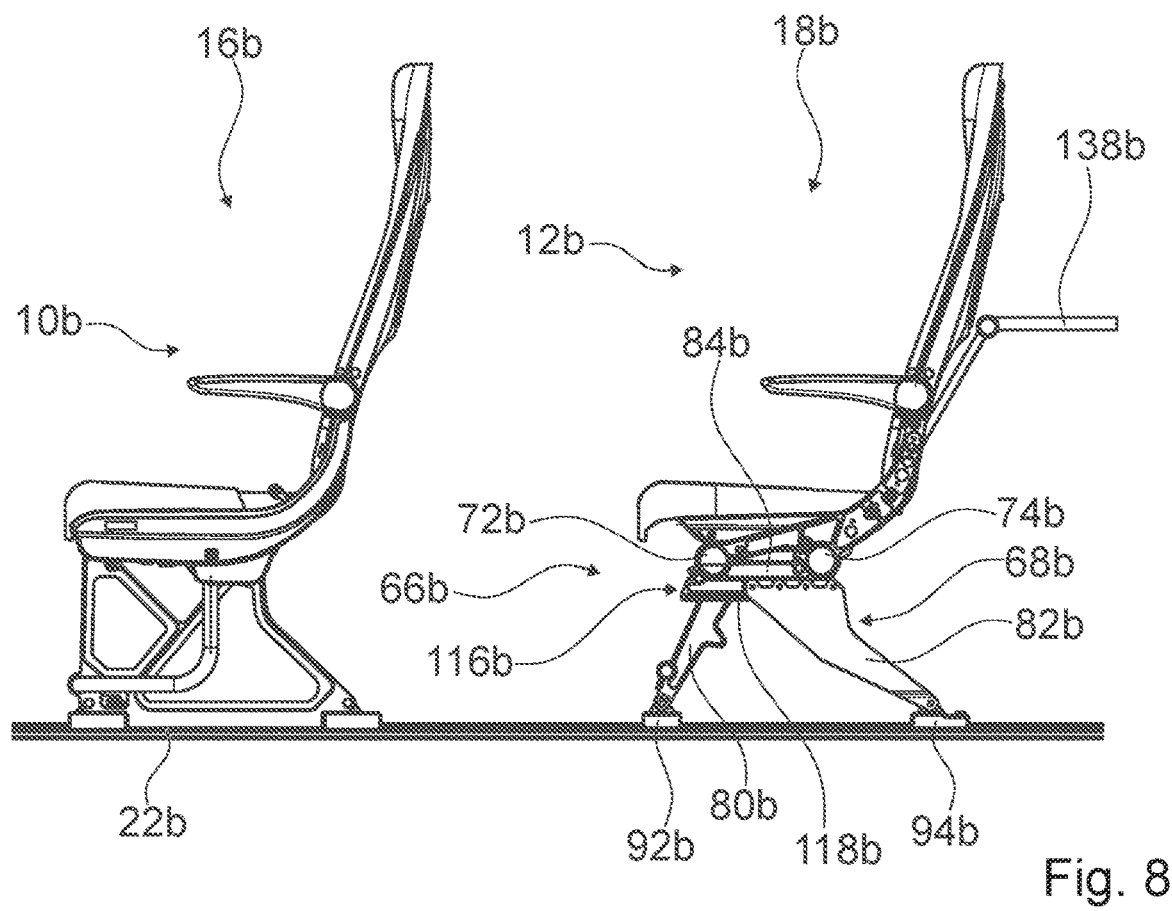
Figure 9:
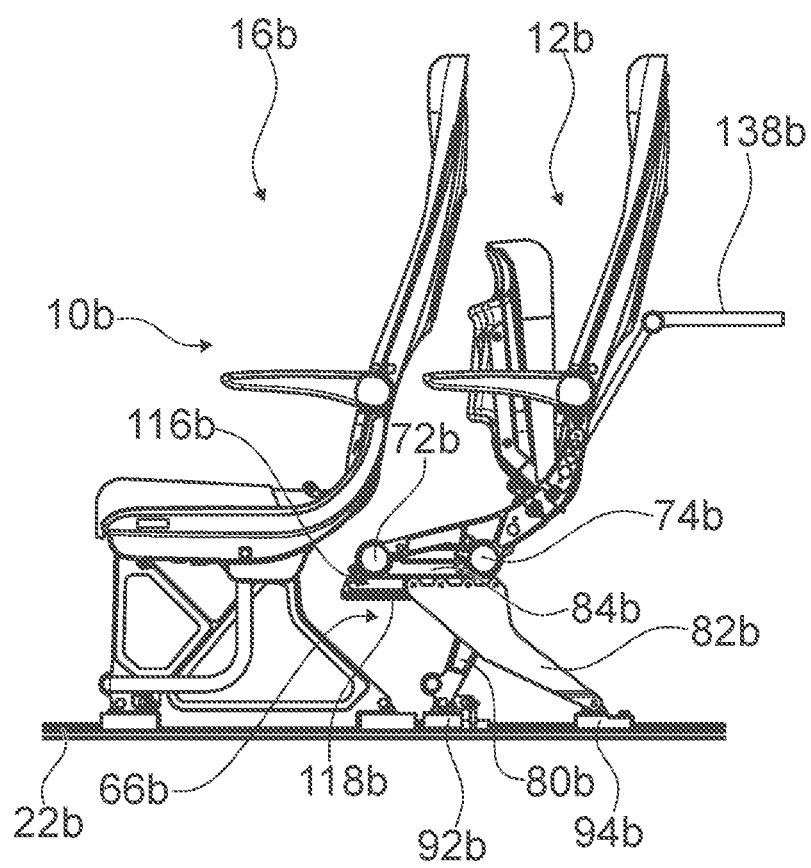

It is shown in:

FIG. 1 a schematic representation of a transport seat system according to the invention, in a first exemplary embodiment with two seats in a usage position, FIG. 2 a schematic representation of the transport seat system with one seat in its stowage position, FIG. 3 a detail view of a mounting module of a rear seat with a front seat foot unit in a stowage position, FIG. 4 a schematic detail view of a seat row with movable seat foot units, FIG. 5 a schematic representation of a seat row with the seats in a usage position, FIG. 6 a detail view of a locking mechanism for a trigger element for an actuation of a fixation element, FIG. 7 a detail view of the trigger element and of the fixation element that is actuated by the trigger element, FIG. 8 a schematic representation of a transport seat system according to the invention in a second exemplary embodiment with two seats in a usage position, FIG. 9 a schematic representation of the transport seat system in the second exemplary embodiment with one seat in its stowage position, FIG. 10 a schematic representation of a transport seat system according to the invention in a third exemplary embodiment with three seats in a usage position, and FIG. 11 a schematic representation of the transport seat system in the third exemplary embodiment with one seat in its stowage position.

DESCRIPTION OF THE EXEMPLARY EMBODIMENTS

FIGS. 1 to 7 show a first exemplary embodiment of a transport seat system according to the invention. The transport seat system is implemented as a seat system for a transport means. The transport seat system is implemented as an aircraft seat system. Principally it is also conceivable that the transport seat system is implemented as a seat system for a different transport means like, for example, as a train seat system or a bus seat system. The transport seat system comprises a first seat 10a. The transport seat system further comprises a second seat 12a. The first seat 10a is implemented as a front seat 10a. The second seat 12a is implemented as a rear seat 12a. The two seats 10a, 12a are implemented as a seat pair 14a. The transport system herein comprises further seat pairs, which are not shown here and are implemented equivalently to the seat pair 14a. The seat pair 14a is mounted in an aircraft cabin. The seats 10a, 12a are herein respectively embodied as part of a seat row 16a, 18a. A seat row 16a, 18a herein respectively comprises three seats 10a, 12a, which are arranged side by side. The seats 10a, 12a of a seat row 16a, 18a are herein embodied in a substantially equivalent fashion. When in the following a seat 10a, 12a is mentioned, this is preferably to mean the entire seat row 16a, 18a which the respective seat 10a, 12a is a part of. Principally it is also conceivable that a seat row 16a, 18a comprises a different number of seats 10a, 12a. The seats 10a, 12a are mounted in an aircraft cabin of an aircraft. Principally it would also be conceivable that the seats 10a, 12a are mounted in a different transport means, e.g. in a passenger space of a bus. The aircraft cabin comprises two fixation rails 20a, which are attached, parallel to one another, in a cabin floor of the aircraft cabin. The fixation rails 20a are herein inserted in the cabin floor. Preferentially further parallel-running fixation rails, via which further seats (not shown) are mountable in the aircraft cabin, are arranged in the aircraft cabin. The transport seat system comprises a first guide rail 22a and a second guide rail 24a. The guide rails 22a, 24a are each fixedly connected to one of the fixation rails 20a of the aircraft cabin. Herein the guide rails 22a, 24a are rigidly mounted on the respective fixation rail 20a. The seats 10a, 12a are coupled with the cabin floor via the guide rails 22a, 24a. Principally it would also be conceivable that the seats 10a, 12a are mounted in the aircraft cabin directly via the fixation rails 20a of the aircraft cabin. In that case the fixation rails 20a would implement the respective functions of the guide rails 22a, 24a.

The first seat 10a is embodied as a front seat. Viewed in a seat direction of the seat 10a, the first seat 10a is arranged in front of the second seat 12a. The second seat 12a is embodied as the rear seat of the seat pair 14a. In a seat direction of the second seat 12a, the second seat 12a is arranged behind the first seat 10a. The first seat 10a is part of the first seat row 16a. The second seat 12a is embodied as part of the second seat row 18a. The first seat row 16a is implemented as a front seat row. In the seat direction of the seats 10a, 12a, the first seat row 16a is arranged in front of the second, rear seat row 18a. The seat directions of the seats 10a, 12a are herein preferably aligned in parallel to a main extension direction of the transport means, like in particular the aircraft cabin. The seat directions of the seats 10a, 12a are herein preferably aligned in a transport direction, in particular in a flight direction. Principally it would however also be conceivable that the seat directions of the two seats extend in opposite directions. Principally it would also be conceivable that the seats 10a, 12a are oriented at an angle to the flight direction. It is herein conceivable, for example, that the seats 10a, 12a are oriented at a 45-degree angle to the flight direction.

The first seat 10a comprises a mounting unit 26a, via which the seat 10a is mounted. All seats 10a of the first seat row 16a are mounted via the mounting unit 26a. The mounting unit 26a comprises a first mounting module 28a and a second mounting module 30a. The first mounting module 28a is connected to the first guide rail 22a. The second mounting module 30a is connected to the second guide rail 24a. The first mounting module 28a and the second mounting module 30a are implemented substantially identically. It is herein conceivable that the two mounting modules 28a, 30a are implemented differently. As the two mounting modules 28a, 30a are implemented identically, in the following only the first mounting module 28a will be described in detail. The mounting unit 26a comprises two transverse supports 32a, 34a. The transverse supports 32a, 34a run parallel to one another. The transverse supports 32a, 34a are embodied as support tubes. The transverse support 32a is embodied as a front support tube. The transverse support 34a is embodied as a rear support tube. The transverse support 32a is herein arranged, in a seat direction of the seat 10a, in front of the transverse support 34a. The transverse supports 32a, 34a extend over the entire width of all seats 10a of the seat row 16a. Via the transverse supports 32a, 34a forces are transferred from the seats 10a of the seat row 16a into the mounting modules 28a, 30a. The seat 10a further comprises a backrest 36a and a seat bottom 38a. The seat bottom 38a and the backrest 36a are coupled with the mounting unit 26a. The backrest 36a and the seat bottom 38a are herein supported movably relative to one another, as a result of which at least two different seat positions are realizable. Principally it is however also conceivable that the backrest 36a and the seat bottom 38a are implemented in such a way that they are rigid and immobile with respect to each other. The backrest 36a and the seat bottom 38a are herein connected to the mounting unit 26a by fastening means which are not described in detail. Herein the backrest 36a and the seat bottom 38a are connected to the mounting unit 26a in a manner that is known from the state of the art.

The mounting module 28a of the seat 10a implements a front seat foot unit 40a and a rear seat foot unit 42a. The front seat foot unit 40a realizes a front seat foot bracing the seat 10a against the guide rail 22a in a front region. The rear seat foot unit 42a realizes a rear seat foot bracing the seat 10a against the guide rail 22a in a rear region. The front seat foot unit 40a comprises a first connection region, via which the front seat foot unit 40a is connected to the front transverse support 32a. The front seat foot unit 40a is herein rigidly coupled with the transverse support 32a via the connection region. The rear seat foot unit 42a also comprises a first connection region, via which the rear seat foot unit 42a is connected to the rear transverse support 34a. The rear seat foot unit 42a is herein rigidly coupled with the transverse support 34a via the connection region. The front seat foot unit 40a and the rear seat foot unit 42a of the mounting module 28a are herein embodied integrally with one another. Principally it would herein also be conceivable that the front seat foot unit 40a and the rear seat foot unit 42a are embodied in a multi-part implementation. The mounting module 28a is realized by a planar plate with several recesses. The mounting module 28a is embodied as a support structure that may have carrier elements and rib elements, depending on the load paths via which forces are discharged into the cabin floor.

For a connection to the guide rail 22a, the seat 10a comprises a first fixation element 44a and a second fixation element 46a. The first fixation element 44a is implemented as a front fixation element and is configured to couple the front seat foot unit 40a with the guide rail 22a. For this purpose the first fixation element 44a is rigidly connected to the front seat foot unit 40a. The second fixation element 46a is implemented as a rear fixation element and is configured to couple the rear seat foot unit 42a with the guide rail 22a. For this purpose the second fixation element 46a is rigidly connected to the rear seat foot unit 42a. The second, rear fixation element 46a is herein embodied as a loose bearing. The second fixation element 46a is connected to the guide rail 22a in a form-fit fashion. The guide rail 22a realizes on each axial side an undercut, in which the fixation element 46a engages in a form-fit fashion. The fixation element 46a is herein supported in such a way that it is displaceable along the displacement direction of the guide rail 22a. The second fixation element 46a does not comprise a fixing element via which the fixation element 46a could be fixed on the guide rail 22a in the displacement direction. Principally it is also conceivable that the second fixation element 46a also comprises a fixing element and is in a usage position fixedly coupled with the guide rail 22a. In this way the seat 10a could be fixedly coupled with the guide rail 22a via both fixation elements 44a, 46a. Forces in the displacement direction of the guide rail 22a cannot be transferred onto the guide rail 22a by the second fixation element 46a. The first fixation element 44a comprises a locking element 48a. Via the locking element 48a the fixation element 44a is fixedly fixatable on the guide rail 22a. Via the locking element 48a the fixation element 44a is fixatable on the guide rail 22a in different positions. The locking element 48a is embodied as a bolt. Principally it is also conceivable that the locking element 48a is embodied in a different manner deemed expedient by someone skilled in the art, e.g. as a hook or as a different form-fit and/or force-fit element. The locking element 48a is movably supported in the fixation element 44a. The locking element 48a herein features at least two positions. In a locked position the locking element 48a fixates the fixation element 44a on the guide rail 22a. In the locked position the locking element 48a connects the fixation element 44a to the guide rail 22a in a form-fit and/or force-fit fashion. In the locked position of the locking element 48a, the fixation element 44a is locked and is not displaceable on the guide rail 42a. In the locked position a force is introducible into the guide rail 22a along the displacement direction of the guide rail 22a via the fixation element 44a. In an unlocked position the locking element 48a is not connected to the guide rail 22a in a form-fit and/or force-fit fashion. In the unlocked position of the locking element 48a, the fixation element 44a is displaceable along the displacement direction of the guide rail 22a. In the unlocked position of the locking element 48a, the entire mounting module 28a is displaceable on the guide rail 22a.

For a fixation of the second mounting module 30a on the second guide rail 24a, the seat 10a comprises a further front fixation element 50a and a second, rear fixation element (not shown in detail), which are implemented equivalently to the fixation elements 44a, 46a described above.

For an adjustment of the seat 10a between a lock position and a displacement position, the seat 10a comprises a trigger element 52a. The trigger element 52a is configured to be actuated by a person, like in particular a staff member. Herein the trigger element 52a is in particular configured to be actuated manually. In particular, the trigger element 52a is configured for a tool-free actuation. In the lock position the seat 10a is fixated on the guide rails 22a, 24a. In the lock position forces acting onto the seat 10a are introducible into the guide rails 22a, 24a, and thus into the cabin floor, via the mounting modules 28a, 30a and the fixation elements 44a, 46a, 50a. In the displacement position the seat 10a is movably connected to the guide rails 22a, 24a in the displacement direction of the guide rails 22a, 24a. In the displacement position the seat 10a is axially displaceable on the guide rails 22a, 24a. The trigger element 52a is embodied as a luggage bar. The trigger element 52a embodied as a luggage bar is arranged underneath the seat bottom 38a and is configured to prevent a slipping through of luggage parts underneath the seat 10a. The trigger element 52a embodied as a luggage bar extends substantially over the entire width of the seat row 16a. The trigger element 52a herein extends from a first lateral end of the left-hand seat of the seat row 16a to a second lateral end of the right-hand seat of the seat row 16a. The trigger element 52a is herein arranged in the region of the front seat foot units 40a of the mounting modules 28a, 30a. On its lateral ends, the trigger element 52a embodied as a luggage bar extends rearwards, viewed in the seat direction. In a rear region the trigger element 52a embodied as a luggage bar extends upwards towards the seat bottom 38a. The trigger element 52a embodied as a luggage bar is movably connected to the mounting modules 28a, 30a. To support the trigger element 52a embodied as a luggage bar, the mounting modules 28a, 30a respectively comprise a bearing accommodation 54a on their front seat foot units 40a. The bearing accommodations 54a are implemented as slide bearings. Via the bearing accommodations 54a, the trigger element 52a embodied as a luggage bar is supported in such a way that it is pivotable relative to the mounting modules 28a, 30a.

For each fixation element 44a, 50a the seat 10a comprises a coupling element 56a. The coupling elements 56a connect the trigger element 52a to the respective locking element 48a of the respective fixation element 44a, 50a. The coupling elements 56a for the two fixation elements 44a, 50a are herein embodied identically, and therefore only the locking element 48a for an actuation of the fixation element 44a will be described in detail below. For an explanation of the coupling element for the fixation element 50a, which is not shown in detail, the description of the coupling element 56a may be referred to. The coupling element 56a is embodied as an actuation lever. On a first end the coupling element 56a is rigidly connected to the trigger element 52a. By the rigid coupling of the coupling element 56a with the trigger element 52a, a rotation of the trigger element 52a is converted into a pivoting of the trigger element 52a. On its second end the coupling element 56a comprises a form-fit element 58a. The form-fit element 58a is configured for a form-fit coupling with the locking element 48a. The form-fit element 58a of the coupling element 56a engages around a head 60a of the locking element 48a in a form-fit fashion. Principally it is also conceivable that the form-fit element 58a is realized in a different manner and is connected to the locking element 48a in a correspondingly different form-fit fashion. By the coupling of the coupling element 56a with the locking element 48a, a movement of the trigger element 52a is converted into a movement of the locking element 48a. In this way the locking element 48a is adjustable between its locked position and its unlocked position by means of the trigger element 52a. In a first position, the trigger element 52a is in a neutral position and the coupling element 56a is oriented in such a way that the locking element 48a is in its locked position. As a result, in the neutral position of the trigger element 52a both front fixation elements 44a, 50a are locked and the seat 10a is fixated on the guide rails 22a, 24a. If the trigger element 52a is rotated out of its neutral position into an actuation position, the locking element 48a is moved from its locked position into its unlocked position by the coupling element 56a.

Principally it would also be conceivable that, for a connection of the rear seat foot units 42a of the mounting modules 28a, 30a, the rear fixation elements 46a comprise a locking element and are adjustable between a locked position and an unlocked position and that, for a connection of the front seat foot units 40a of the mounting modules 28a, 30a, the front fixation elements 44a, 50a are embodied as loose bearings.

The seat 10a comprises a locking mechanism 62a. The locking mechanism 62a is configured to fixate the trigger element 52a in its neutral position. The locking mechanism 62a is arranged on an end of the trigger element 52a that is embodied as a luggage bar. The locking mechanism 62a is herein arranged on an underside of an aisle-side seat of the first seat row 16a. The locking mechanism 62a is arranged behind an impact protection 136a of the seat 10a. The locking mechanism 62a is implemented as a snap mechanism. The locking mechanism 62a comprises a form-fit element 64a. Via the form-fit element 64a the trigger element 52a is fixated in its neutral position. The trigger element 52a is embodied as a pivotable hook that is connected to the mounting unit 26a. The locking mechanism 62a comprises a locking bolt 138a, which is fixedly connected to the trigger element 52a. In a locked state the locking bolt 138a is connected to the form-fit element 64a in a form-fit fashion. In FIG. 6 the locked state of the locking mechanism 62a is depicted, in which the locking bolt 138a is arranged in the form-fit element 64a. If the locking bolt 138a is arranged in the form-fit element 64a, the locking bolt 138a, and thus the trigger element 52a, is fixated in all directions. In this way an unlocking of the locking mechanism 62a due to a force/forces acting onto the trigger element 52a, which is embodied as a luggage bar, is effectively prevented. The locking mechanism 62a comprises an actuation element 140a. The actuation element 140a is configured for unlocking the locking mechanism 62a. The actuation element 140a is embodied as a lever element which is connected to the form-fit element 64a. To unlock the locking mechanism 62a, the actuation element 140a is configured to be moved in an unlocking direction 142a. The unlocking direction 142a is herein oriented towards a mounting plane. For an actuation, the actuation element 140a comprises an opening, in which a pull element (not shown here) is attachable. By a connection of a pull element, simple unlocking is achievable. Principally it is also conceivable that the opening of the actuation element 140a has a specific shape, resulting in a corresponding tool being required for an advantageous operation of the actuation element 140a. This advantageously allows ensuring that only authorized persons unlock the locking mechanism 62a.

By moving the actuation element 140a into the unlocking direction 142a, the form-fit element 64a is rotated, thus releasing the locking bolt 138a and with it the trigger element 52a obliquely upwards. In an unlocked state, the locking bolt 138a is released from the form-fit element 64a. As a result of this, the trigger element 52a is pivotable. For a locking, the locking bolt 138a is once again brought into a form-fit contact with the form-fit element 58a by the trigger element 52a pivoting back, as a result of which the form-fit element 58a re-latches the trigger element 52a in the neutral position. Herein the form-fit element 58a is held in this position, for example, by a latch element or by a spring force exerted by a spring element.

In a fully mounted state of the seat 10a, the locking mechanism 62a is covered by a cover element 120a. The locking mechanism 62a comprises a display element 122a. The display element 122a is configured to indicate whether the locking mechanism 62a is locked or not. The display element 122a is arranged in the cover element 120a. The display element 122a is embodied as a mechanical element. The display element 122a is configured to output an optical signal. Principally it is also conceivable that, in addition to the optical signal, an acoustic signal is output by the display element 122a at the moment when the locking mechanism 62a latches in. Principally it is also conceivable that the display element 122a is embodied as an electrical or electromagnetical element outputting an optical signal.

The second seat 12a comprises a mounting unit 66a via which the seat 12a is mounted. Via the mounting unit 66a all seats 12a of the second seat row 18a are mounted on the cabin floor. The mounting unit 66a comprises a first mounting module 68a and a second mounting module 70a. The first mounting module 68a is connected to the first guide rail 22a. The second mounting module 70a is connected to the second guide rail 24a. Via the mounting modules 68a, 70a, the second seat 12a is coupled to the same guide rails 22a, 24a as the first seat 10a via its mounting modules 28a, 30a. The first mounting module 68a and the second mounting module 70a are implemented substantially identically. Herein it is conceivable that the two mounting modules 68a, 70a are implemented differently. As the two mounting modules 68a, 70a are implemented identically, only the first mounting module 68a will be described in detail in the following description. The mounting unit 66a comprises two transverse supports 72a, 74a. The transverse supports 72a, 74a extend in parallel to one another. The transverse supports 72a, 74a are embodied as support tubes. The transverse support 72a is embodied as a front support tube. The transverse support 74a is embodied as a rear support tube. Viewed in the seat direction of the seat 12a, the transverse support 72a is herein arranged in front of the transverse support 74a. The transverse supports 72a, 74a herein extend over the entire width of all seats 12a of the seat row 18a. Via the transverse supports 72a, 74a forces are transferred from the seats 12a of the seat row 18a into the mounting modules 68a, 70a. The seat 12a further comprises a backrest 76a and a seat bottom 78a. The seat bottom 78a and the backrest 76a are coupled with the mounting unit 66a. The backrest 76a and the seat bottom 78a are herein supported movably to each other, as a result of which at least two different seat positions are implementable. The backrest 76a and the seat bottom 78a are herein connected to the mounting unit 66a via fastening means (not described in detail). The seat bottom 78a is herein pivotably connected to the mounting unit 66a and is thus adjustable between a usage position, in which a passenger may sit on the seat bottom 78a, and a stowage position, in which the seat bottom 78a is pivoted rearwards toward the backrest 76a. The backrest 76a and the seat bottom 78a are herein connected to the mounting unit 66a in a manner that is known from the state of the art.

The mounting module 68a of the seat 12a implements a front seat foot unit 80a and a rear seat foot unit 82a. The front seat foot unit 80a implements a front seat foot bracing the seat 12a against the guide rail 22a in a front region. The rear seat foot unit 82a implements a rear seat foot bracing the seat 12a against the guide rail 22a in a rear region. The mounting module 68a comprises a base body 84a. The base body 84a implements the rear seat foot unit 82a as well as a support region 86a between the two transverse supports 72a, 74a. In the support region 86a the base body 84a implements a bearing accommodation 88a for the front transverse support 72a and a bearing accommodation 90a for the rear transverse support 74a. The base body 84a is rigidly connected to the transverse supports 72a, 74a via the bearing accommodations 88a, 90a. The base body 84a implements the rear seat foot unit 82a and the support region 86a integrally with one another.

For a connection to the guide rail 22a, the seat 12a comprises a first fixation element 92a and a second fixation element 94a. The first fixation element 92a is embodied as a front fixation element and is configured to couple the front seat foot unit 80a with the guide rail 22a. For this purpose the first fixation element 92a is fixedly connected to the front seat foot unit 80a. The second fixation element 94a is embodied as a rear fixation element and is configured to couple the rear seat foot unit 82a with the guide rail 22a. For this purpose the second fixation element 94a is rigidly connected to the rear seat foot unit 82a. The second, rear fixation element 94a is herein embodied as a fixed bearing. Principally it is also conceivable that both fixation elements 92a, 94a are embodied as fixed bearings or that the front fixation element 92a is embodied as a fixed bearing and the rear fixation element 94a is embodied as a loose bearing. The second fixation element 94a is connected to the guide rail 22a in a form-fit fashion. Herein the rear fixation element 94a is fixedly connected to the guide rail 22a via a locking element, which is not shown in detail. Via the rear fixation element 94a, in a locked state forces are introducible into the guide rail 22a in all directions.

The first fixation element 92a is embodied as a loose bearing. The first fixation element 92a is connected to the guide rail 22a in a form-fit fashion. The fixation element 92a is herein supported in such a way that it is displaceable along the displacement direction of the guide rail 22a. The first fixation element 92a does not comprise a fixing element via which the fixation element 92a could be fixed on the guide rail 22a in the displacement direction. Forces in a displacement direction of the guide rail 22a cannot be transferred onto the guide rail 22a by the first fixation element 92a. The front seat foot unit 80a of the mounting module 68a is supported in such a way that it is movable relative to the base body 84a of the mounting module 68a. For the purpose of a movable support of the front seat foot unit 80a, the mounting module 68a comprises a pivot bearing 96a. The pivot bearing 96a is implemented by the base body 84a and the front seat foot unit 80a. The base body 84a comprises an accommodation region 98a on its front end, in a region underneath the front transverse support 72a. The accommodation region 98a has a substantially triangular shape. The accommodation region 98a herein implements an accommodation recess (not shown), in which a bearing bolt 100a is supported. Via the bearing bolt 100a, the front seat foot unit 80a is pivotably supported by means of a bearing accommodation. Inner walls of the accommodation region 98a, which is embodied triangle-shaped, realize abutment surfaces which the front seat foot unit 80a abuts on with its two end positions. A first end position is herein implemented as a usage position of the front seat foot unit 80a. Herein the seat foot unit 80a abuts on the frontward abutment surface of the accommodation region 98a with a front side in the usage position. The front seat foot unit 80a realizes a bracing region 102a. The bracing region 102a is embodied by a ledge at the front side of the seat foot unit 80a. The bracing region 102a is configured to allow, in the usage position, forces being introduced from the base body 84a directly into the front seat foot unit 80a. On a front end, the base body 84a forms an abutment surface 104a, which is embodied correspondingly to the bracing region 102a. In the usage position the front seat foot unit 80a abuts on the abutment surface 104a of the base body 84a. As a result, a force is directly transferable between the abutment surface 104a and the bracing region 102a in the usage position of the front seat foot unit 80a. A second end position of the front seat foot unit 80a is realized as a stowage position. In the stowage position, the front seat foot unit 80a is pivoted rearward, toward the rear seat foot unit 82a. The front seat foot unit 80a herein abuts on the abutment surface of the accommodation region 98a with a rear rearside. The front seat foot unit 80a further comprises a bracing element 106a, which is arranged in a middle region of the seat foot unit 80a. The bracing element 106a is embodied as an elevation on the rear side of the front seat foot unit 80a. In the stowage position the bracing element 106a abuts on a front side of the rear seat foot unit 82a. Via the bracing element 106a forces are introducible into the rear seat foot unit 82a in the stowage position of the front seat foot unit 80a. The mounting module 68a herein comprises only one support unit, namely the pivot bearing 96a, via which a supporting portion of the mounting unit 66a is supported relative to a movable portion of the mounting unit 66a. This allows achieving a secure stand of the seat 12a both in the stowage position and in the usage position.

The seat 12a comprises a trigger lever 124a, via which the front seat foot unit 80a is pivotable. The trigger lever 124a is embodied in a one-part implementation with the front seat foot unit 80a. Principally it is also conceivable that the trigger lever 124a is merely fixedly connected to the front seat foot unit 80a. The trigger lever 124a is arranged on an upper end of the front seat foot unit 80a. Herein, for an actuation of the trigger lever 124a, first of all the seat bottom 78a is to be brought from its usage position into its stowage position. In the usage position of the front seat foot unit 80a, the trigger lever 124a is arranged at a level of the front transverse support 72a. In the usage position of the first seat foot unit 80a, the trigger lever 124a does not extend over the front transverse support 72a. In the stowage position of the front seat foot unit 80a, the trigger lever 124a is oriented upwards, away from the mounting plane. Herein, in the stowage position of the front seat foot unit 80a, the trigger lever 124a extends over the front transverse support 72a. Because of this, in the stowage position of the front seat foot unit 80a, it is not possible to bring the seat bottom 78a into its usage position as the trigger lever 124a blocks the passage. In this way an erroneous mounting of the seat 12a is advantageously preventable. Advantageously, due to the trigger lever 124a, the seat 12a is not usable in a stowage position of the front seat foot unit 80. It is herein possible that in both positions the trigger lever 124a may just be gripped by a staff member for an adjustment of the front seat foot unit 80a between the stowage position and the usage position.

The seat 12a comprises a locking mechanism 108a. The locking mechanism 108a is configured to secure the front seat foot unit 80a in the usage position and in the stowage position. The locking mechanism 108a comprises a spring-loaded locking pin 110a. The locking pin 110a is movably supported in the front seat foot unit 80a. For this purpose the locking pin 110a is supported axially displaceably in an accommodation hole of the front seat foot unit 80a. Herein a spring element is arranged in the seat foot unit 80a, exerting onto the locking pin 110a a closure force, by which the locking pin 110a is pushed into a closure position. The locking mechanism 108a comprises two accommodation holes 112a, 114a implemented by the base body 84a. The accommodation holes 112a, 114a are arranged in the accommodation region 98a. The accommodation holes 112a, 114a are embodied equivalently to the locking pin 110a. The accommodation holes 112a, 114a are configured such that, for locking the front seat foot unit 80a, the locking pin 110a is arranged in the accommodation holes 112a, 114a in a form-fit fashion. The accommodation hole 112a is herein allocated to the usage position of the front seat foot unit 80a. If the front seat foot unit 80a is in the usage position, the locking pin 110a is arranged in the accommodation hole 112a in a form-fit fashion, thus locking the seat foot unit 80a in the usage position. The accommodation hole 114a is allocated to the stowage position of the front seat foot unit 80a. If the front seat foot unit 80a is in the stowage position, the locking pin 110a is arranged in the accommodation hole 114a in a form-fit fashion, thus locking the seat foot unit 80a in the stowage position. For an adjustment of the seat foot unit 80a between the stowage position and the usage position, a user actuates the locking pin 110a by axially pulling the locking pin 110a out of the respective accommodation hole 112a, 114a, counter to the spring force of the spring element. Following an adjustment into the desired position, the locking pin 110a autonomously latches in the respective accommodation hole 112a, 114a due to the spring force of the spring element.

The seat 12a features at least one usage position and a stowage position. The seat 12a has a first usage position, which is implemented as a TTL position. In the TTL position the backrest 76a and the seat bottom 78a are oriented substantially at a right angle with respect to each other. In the TTL position the backrest 76a is oriented in an upright position and substantially perpendicularly to the cabin floor. The seat 12a has further usage positions, like in particular a comfort position, in which the backrest 76a is pivoted rearwards relative to the seat bottom 78a.

The two seats 10a, 12a of the seat rows 16a, 18a may be arranged in different positions with respect to one another. The seats 10a, 12a have at least one usage position and a stowage position. The seats 10a, 12a have a first usage position, which is implemented as a TTL position. In the TTL position the backrests 36a, 76a and the seat bottoms 38a, 78a of the seats 10a, 12a are oriented respectively at right angles to one another. In the TTL position the backrests 36a, 76a are oriented in an upright position and substantially perpendicularly to the cabin floor. The seats 10a, 12a have further usage positions, like in particular one comfort position respectively, in which the backrest 36a, 76a is pivoted rearwards relative to the seat bottom 38a, 78a. In a usage position of both seats 10a, 12a, the two seats 10a, 12a have a distance of 28 inches, measured from front edge to front edge. Principally it is also conceivable that the seats 10a, 12a have a different distance as is deemed expedient by someone skilled in the art, like in particular, for example, 27 inches or 29 inches. Both seats 10a, 12a are herein locked in their usage positions. Thus passengers may sit on the seats 10a, 12a of both seat rows 16a, 18a. To increase a leg room for the seats 10a of the front seat row 16a, the seats 12a of the rear seat row 18a may be brought into a stowage position. For this purpose, first of all the front seat foot units 80a of the mounting modules 68a, 70a of the rear seats 12a are pivoted from their usage position into their stowage positions. For this, the locking pins 110a are now released out of the respective accommodation holes 112a and the front seat foot unit 80a is pivoted around the bearing bolt 100a of the pivot bearing 96a into the stowage position. In the pivoting of the front seat foot unit 80a the mounting unit 66a is herein lifted at least partially. The front fixation elements 92a, via which the mounting modules 68a, 70a are connected to the guide rails 22a, 24a, are displaced along the guide rails 22a, 24a towards the rear fixation elements 94a until the front seat foot unit 80a abuts on the rear seat foot unit 82a with the bracing element 106a. Then the seats 10a of the front seat row 16a are brought from their lock position into their displacement position by bringing the front fixation elements 44a, 50a from their locked position into their unlocked position via the trigger element 52a that is embodied as a luggage bar. For this purpose, the trigger element 52a is unlocked and rotated by means of the locking mechanism 62a. When the seats 10a of the seat row 16a are in their displacement position, the seats 10a are displaced on the guide rails 22a, 24a towards the seats 12a of the second seat row 18a. The front seats 10a are herein traversed towards the rear seats 12a by such a distance that the rear seat foot units 42a of the mounting modules 28a, 30a of the seats 10a are arranged partially overlapping with the mounting modules 68a, 70a of the seats 12a. The mounting modules 28a, 30a of the seats 10a extend until beneath the base bodies 84a of the mounting modules 68a, 70a of the rear seats 12a. The rear fixation elements 46a are herein arranged underneath the mounting unit 26a, in particular underneath the front transverse support 32a. The seats 10a, 12a each realize an enveloping curve 126a, 128a. The enveloping curves 126a, 128a herein each realize an imaginary rectangle around the largest dimensions of the seats 10a, 12a. In the usage positions of both seats 10a, 12a the enveloping curves 126a, 128a are arranged spaced apart from one another. In the stowage position of the seat 12a, in which the front seat 10a has been pushed toward the seat 12a (FIG. 2), the enveloping curves 126a, 128a have an overlap of 35 percent. If the front seats 10a are pushed rearwards by a maximum, the seats 10a are re-set into a lock position via the trigger element 52a and the fixation elements 44a, 50a. The front seats 10a of the seat row 16a are then back in their usage position and may be used by passengers. Due to their rearward displacement, the seats 10a herein now have an increased legroom, resulting in particular in achieving an increased comfort for the seats 10a. The seats 12a of the rear seat row 18a are in a stowage position and not usable by passengers. In the stowage position the backrests 76a of the seats 12a have a same position as in the usage position. In particular, the backrests 76a of the seats 12a have a same orientation in the stowage position as in the TTL position. The backrests 76a of the seats 12a are herein arranged at a same level in the stowage position as in the stowage position. In an adjustment from the usage position into the stowage position, the backrests 76a of the seats 12a are not displaced relative to the mounting modules 68a, 70a of the seats 12a. The backrest 76a of the rear seat 12a is herein, in the stowage position, in an upright position. Herein the backrest 76a of the rear seat 12a is oriented substantially identically to the usage position. The seat 12a comprises a utility element 130a, which is embodied as a table, on a rear side of the backrest 76a. Herein the utility element 130a is indicated in the figures in a stowage position. The utility element 130a, which is embodied as a table, is herein usable in a stowage position of the seat 12a by a passenger sitting behind the seat 12a. Likewise the backrest 76a of the second seat 12a has a same height in the stowage position as well as in the usage position of the seat 12a. In particular, the backrest 76a of the second seat 12a does not have a greater height in the stowage position of the second seat 12a than in the usage position. This advantageously allows complying with safety standards in aircraft cabins.

FIGS. 8 to 11 show two further exemplary embodiments of the invention. The following descriptions and the drawings are substantially limited to the differences between the exemplary embodiments, wherein regarding identically denominated structural components, in particular regarding structural components having the same reference numerals, the drawings and/or descriptions of the other exemplary embodiments, in particular of FIGS. 1 to 7, may principally also be referred to. To differentiate between the exemplary embodiments, the letter a has been added to the reference numerals of the exemplary embodiment of FIGS. 1 to 7. In the exemplary embodiments of FIGS. 8 to 11, the letter a has been replaced by the letters b and c.

FIGS. 8 and 9 show a second exemplary embodiment of the transport seat system according to the invention. The transport seat system is implemented as an aircraft seat system. The transport seat system comprises a first seat 10b. The transport seat system further comprises a second seat 12b. The first seat 10b is implemented as a front seat 10b. The second seat 12b is implemented as a rear seat 12b. The two seats 10b, 12b are implemented as a seat pair 14b. The seats 10b, 12b are herein each embodied as part of a seat row 16b, 18b. Here a seat row 16b, 18b respectively comprises three seats 10b, 12b arranged side by side. An aircraft cabin comprises two fixation rails 20b, which are attached in parallel in a cabin floor of the aircraft cabin. The transport seat system comprises a first guide rail 22b and a second guide rail. The seats 10b, 12b are coupled with the cabin floor via the guide rails 22b. The first seat 10b is embodied as a front seat. The seats 10b of the front seat row 16b are embodied equivalently to the front seats of the first exemplary embodiment and are therefore not described in detail in the following.

Relative to the first exemplary embodiment, the rear seats 12b of the seat row 18b are implemented differently. The second seat 12b comprises a mounting unit 66b, via which the seat 12b is mounted. Via the mounting unit 66b all seats 12b of the second seat row 18b are mounted on the cabin floor. The mounting unit 66b comprises a first mounting module 68b and a second mounting module. The first mounting module 68b is connected to the first guide rail 22b. The second mounting module is connected to the second guide rail. The second seat 12b is coupled, via its mounting modules 68b, to the same guide rails 22b as the first seat 10b via its mounting modules. The first mounting module 68b and the second mounting module are embodied substantially identically. The mounting unit 66b comprises two transverse supports 72b, 74b. The transverse supports 72b, 74b extend in parallel to one another. The transverse supports 72b, 74b are embodied as support tubes.

The mounting module 68b of the seat 12b implements a front seat foot unit 80b and a rear seat foot unit 82b. The front seat foot unit 80b implements a front seat foot bracing the seat 12b against the guide rail 22b in a front region. The rear seat foot unit 82b implements a rear seat bas, bracing the seat 12b against the guide rail 22b in a rear region. The mounting module 68b comprises a base body 84b. The base body 84b realizes a support region 86b between the transverse supports 72b, 74b. The rear seat foot unit 82b is rigidly connected to the base body 84b. The rear seat foot unit 82b is fixedly connected to the guide rail 22b via a fixation element 94b. The front seat foot unit 80b of the mounting module 68b is supported movably with respect to the base body 84b of the mounting module 68b. The front seat foot unit 80b is connected to the guide rail 22b via a fixation element 92b. For a movable support of the front seat foot unit 80b, the mounting module 68b comprises a linear bearing 116b. Via the linear bearing 116b the front seat foot unit 80b is displaceable relative to the base body 84b along a displacement axis. The base body 84b realizes a portion of the linear bearing 116b. The base body 84b implements a guide rail 118b. The guide rail 118b implements a displacement axis, which runs in parallel to the guide rail 22b. The linear bearing 116b realizes, on an upper end of the seat foot unit 80b facing towards the base body 84b, a guide element which engages into the guide rail 118b of the linear bearing 116b in a form-fit fashion. Via the guide element the seat foot unit 80b is displaceable in parallel along the guide rail 118b of the linear bearing 116b. In this way the front seat foot unit 80b is displaceable between its usage position and its stowage position. Like in the preceding exemplary embodiment, the two seats 10b, 12b of the seat rows 16b, 18b may be arranged in various positions relative to each other. An adjustment is herein effected substantially equivalently to the adjustment in the first exemplary embodiment, with the difference that the front seat foot units 80b of the mounting modules 68b are displaced in parallel and not pivoted relative to the base body 84. The seat 12b comprises, on a rear side of the backrest 76b, a utility element 130b that is embodied as a table. Herein, in FIGS. 8 and 9 the utility element 130b is depicted in a usage position. The utility element 130b that is embodied as a table is herein usable in the stowage position of the seat 12b by a passenger sitting behind the seat 12b.

FIGS. 10 and 11 illustrate a third exemplary embodiment of the transport seat system according to the invention. The transport seat system is implemented as an aircraft seat system. The transport seat system comprises two guide rails 22c. The transport seat system comprises a first seat 10c. The transport seat system further comprises a second seat 12c. The transport seat system comprises a third seat 132c. The third seat 132c is embodied as a part of a third seat row 134c. The third seat 132c is arranged in front of the second seat 12c. Differently from the two preceding exemplary embodiments, the first seat 10c is implemented as a rear seat 10c and the second seat 12c is embodied as a middle seat 12c and is arranged in front of the rear seat 10c. The rear seat 10c is adjustable between a lock position and a displacement position by means of a trigger element. This is effected in a manner equivalent to the front seat of the first exemplary embodiment. The third, foremost seat 132c of the seat row 134c is implemented equivalently to the rear seat 10c. The foremost, third seat 132c is herein arranged displaceably on the guide rails 22c. Principally it would also be conceivable that both the front, third seat 132c and the rear seat 10c are fixedly arranged on the guide rails 22c. The second seat 12c comprises a mounting unit 66c, via which the seat 12c is mounted. All seats 12c of a second seat row 18c are mounted on the cabin floor via the mounting unit 66c. The mounting unit 66c comprises a first mounting module 68c and a second mounting module. The first mounting module 68c is connected to the first guide rail 22c. The second mounting module is connected to the second guide rail. Via the mounting modules 68c, the second seat 12c is coupled to the same guide rails 22c as the first seat 10c and the third seat 132c via their respective mounting modules. The first mounting module 68c and the second mounting module are implemented substantially identically. The mounting unit 66c comprises two transverse supports 72c, 74c. The transverse supports 72c, 74c extend in parallel to one another. The transverse supports 72c, 74c are embodied as support tubes.

The mounting module 68c of the seat 12c implements a front seat foot unit 80c and a rear seat foot unit 82c. The front seat foot unit 80c implements a front seat foot bracing the seat 12c against the guide rail 22c in a front region. The rear seat foot unit 82c implements a rear seat foot bracing the seat 12c against the guide rail 22c in a rear region. The mounting module 68c comprises a base body 84c. The base body 84c implements a support region 86c between the transverse supports 72c, 74c. Other than in the preceding exemplary embodiment, the front seat foot unit 80c is rigidly connected to the base body 84c. The front seat foot unit 80c is connected to the guide rail 22c via a fixation element 92c. The fixation element 92c comprises a fixing means (not shown in detail), via which the fixation element 92c may be fixedly coupled with the guide rail 22c in a position-fixed manner. The fixation element 92c is in a locked position fixedly connected to the guide rail 22c and is in an unlocked position displaceable on the guide rail 22c. The rear seat foot unit 82c of the mounting module 68c is supported in such a way that it is movable relative to the base body 84c of the mounting module 68c. The rear seat foot unit 82c is connected to the guide rail 22c by a fixation element 94c. The fixation element 94c comprises a fixing means (not shown in detail), via which the fixation element 94c may be fixedly coupled with the guide rail 22c in a position-fixed manner. The fixation element 94c is in a locked position fixedly connected to the guide rail 22c and is in an unlocked position displaceable on the guide rail 22c. For a movable support of the rear seat foot unit 82c, the mounting module 68c comprises a linear bearing 116c. Via the linear bearing 116c the rear seat foot unit 82c is displaceable relative to the base body 84c along a displacement axis. The displacement of the rear seat foot unit 82c is herein effected equivalently to the displacement of the front seat foot unit of the second exemplary embodiment.

The three seats 10c, 12c, 132c of the seat rows 16c, 18c, 134c may be arranged in different positions relative to one another. Herein, in contrast to the preceding exemplary embodiments, the rear seat foot unit 82c is displaced between a usage position and a stowage position and then the entire middle seat 12c is displaced toward the front seat 132c on the guide rails 22c. As a result of this, the forwards-displaced seat 12c is displaced in its stowage position while the seats 10c, 132c remain in their usage position. The third, front seat 132c of the seat row 134c is not displaced. It is therefore conceivable that the front, third seat 132c is rigidly connected to the guide rail 22c. Principally it is herein conceivable that the front seat 132c is implemented in a different fashion that is deemed expedient by someone skilled in the art, and is fixedly fixated in a fixation rail which is inserted in the cabin floor. Principally it would also be conceivable that an aircraft wall of the aircraft cabin is arranged instead of the front seat 132c. In that case the seat 12c would be pushed to the aircraft wall in a locked position. Herein the rear seat 10c also remains fixed in its position. As a result of this, a distance increases between the rear seat 10c and the middle seat 12c, which is now in its stowage position. This allows advantageously augmenting a legroom for the seats 10c of the seat row 16c. A distance between the front, third seat 132c and the rear seat 10c remains the same.

REFERENCE NUMERALS 10 seat
12 seat
14 seat pair
16 seat row
18 seat row
20 fixation rail
22 guide rail
24 guide rail
26 mounting unit
28 mounting module
30 mounting module
32 transverse support
34 transverse support
36 backrest
38 seat bottom
40 front seat foot unit
42 rear seat foot unit
44 fixation element
46 fixation element
48 locking element
50 fixation element
52 trigger element
54 bearing accommodation
56 coupling element
58 form-fit element
60 head
62 locking mechanism
64 form-fit element
66 mounting unit
68 mounting module
70 mounting module
72 transverse support
74 transverse support
76 backrest
78 seat bottom
80 front seat foot unit
82 rear seat foot unit
84 base body
86 support region
88 bearing accommodation
90 bearing accommodation
92 fixation element
94 fixation element
96 pivot bearing
98 accommodation region
100 bearing bolt
102 bracing region
104 abutment surface
106 bracing element
108 locking mechanism
110 locking pin
112 accommodation hole
114 accommodation hole
116 linear bearing
118 guide rail
120 cover element
122 display element
124 trigger lever
126 enveloping curve
128 enveloping curve
130 utility element
132 seat
134 seat row
136 impact protection
138 locking bolt
140 actuation element
142 unlocking direction

The invention claimed is:

1. An aircraft seat system, comprising:
at least one first seat, which comprises at least one mounting module that is configured, for the purpose of mounting the seat in a transport means, to be connected on a guide rail, and
at least one second seat, which is arranged behind the first seat and comprises at least one mounting module that is configured, for the purpose of mounting the seat in the transport means, to be connected on the same guide rail, the two seats being configured, for the purpose of implementing a usage position and a stowage position of at least one of the seats, to be displaced on the guide rail relative to one another,
wherein
at least one mounting module of at least one of the seats comprises a seat foot unit, which is movably supported relative at least to a portion of the mounting module other than the seat foot unit,
the seats each comprise a backrest, which has a same upright position, in the usage position as well as in the stowage position and
in the stowage position, at least one of the seats is arranged with its mounting module at least partially overlapping with the mounting module of the other seat.

2. The aircraft seat system according to claim 1, wherein the movable seat foot unit is embodied as a front seat foot unit of the second seat.

3. The aircraft seat system according to claim 2, wherein the mounting module comprises a pivot bearing, via which the front seat foot unit is pivotable.

4. The aircraft seat system according to claim 1, wherein the one seat foot unit of the mounting module of the one seat is movable relative to a second seat foot unit for the purpose of an adjustment between the usage position and the stowage position.

5. The aircraft seat system according to claim 1, wherein the mounting module comprises a linear bearing, via which the movable seat foot unit is displaceable with respect to the other seat foot unit.

6. The aircraft seat system according to claim 1, wherein the mounting module of the second seat implements a base body, which implements a rear seat foot unit as well as a support region between two transverse supports of the seat.

7. The aircraft seat system according to claim 6, wherein the entire trigger element is movably supported in the at least one mounting module.

8. The aircraft seat system according to claim 6, wherein the mounting modules of the seats coincide along a displacement direction of a guide rail via which the seats are mounted.

9. The aircraft seat system according to claim 1, wherein the first seat comprises at least one trigger element, which is configured to be actuated for adjusting the first seat between a lock position and a displacement position.

10. The aircraft seat system according to claim 9, wherein the first seat comprises at least two mounting modules, which are together triggered by the trigger element.

11. The aircraft seat system according to claim 9, wherein the trigger element is embodied as a luggage bar.

12. The aircraft seat system according to claim 9, wherein the first seat comprises at least one fixation element, which couples the at least one mounting module with the guide rail, wherein the fixation element comprises at least one locking element that is adjustable between a locked position and an unlocked position by the trigger element.

13. The aircraft seat system according to claim 12, wherein the first seat comprises at least one second fixation element for a connection to a second guide rail, wherein the second fixation element is actuatable together with the first fixation element by the trigger element.

14. The first seat in the aircraft seat system, according to claim 1, comprising a first mounting module comprising a first seat foot unit, which is movably supported relative to at least a portion of the first mounting module.

15. The first seat in the aircraft seat system, according to claim 1, comprising at least one trigger element, which is configured to be actuated for an adjustment of the first seat between a lock position and a displacement position.

16. An aircraft seat system, comprising
at least one first seat, which comprises at least one mounting module that is configured, for the purpose of mounting the seat in a transport means, to be connected on a guide rail, and
at least one second seat, which is arranged behind the first seat and comprises at least one mounting module that is configured, for the purpose of mounting the seat in the transport means, to be connected on the same guide rail, the two seats being configured, for the purpose of implementing a usage position and a stowage position of at least one of the seats, to be displaced on the guide rail relative to one another,
wherein
at least one mounting module of at least one of the seats comprises a seat foot unit, which is movably supported relative at least to a portion of the mounting module,
the seats each comprise a backrest, which has a same upright position, in the usage position as well as in the stowage position,
in the stowage position, at least one of the seats is arranged with its mounting module at least partially overlapping with the mounting module of the other seat, and
enveloping curves of the two seats coincide in the stowage position by at least 20%.

17. A vehicle seat system, comprising
a guide rail formed on a floor of a vehicle;
a first seat including a first mounting module connected to the guide rail and a first backrest; and
a second seat arranged behind the first seat and including a second mounting module connected on the guide rail and a second backrest,
wherein
the first and second seats are configured to be displaced on the guide rail relative to one another when moving between a usage position and a stowage position,
the second mounting module comprises a seat foot unit that is movably supported relative to the second mounting module,
the first backrest and the second backrest each have a same upright position in both the usage position and the stowage position, and
in the stowage position, one of the first and second seats is arranged with its mounting module at least partially overlapping the mounting module of the other of the first and second seats with respect to the floor of the vehicle.

18. The vehicle seat system according to claim 17, wherein
the first seat further includes a first seat bottom,
the second seat further includes a second seat bottom,
the first seat bottom and the first backrest are both coupled to the first mounting module, and
the second seat bottom and the second backrest are both coupled to the second mounting module.

* * * * *